US012620744B2

(12) United States Patent
Bachórz et al.

(10) Patent No.: US 12,620,744 B2
(45) Date of Patent: May 5, 2026

(54) CONNECTOR SYSTEM WITH TOOL-ACCESSIBLE LATCHING MECHANISM

(71) Applicant: Aptiv Technologies AG, Schaffhausen (CH)

(72) Inventors: Wioleta Bachórz, Cracow (PL); Piotr Najduch, Wieliczka (PL); Krzysztof Pitala, Mszana Dolna (PL); Michał Grudzewski, Cracow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 284 days.

(21) Appl. No.: 18/128,386

(22) Filed: Mar. 30, 2023

(65) Prior Publication Data

US 2023/0327358 A1 Oct. 12, 2023

(30) Foreign Application Priority Data

Apr. 11, 2022 (EP) .................................... 22167638

(51) Int. Cl.
*H01R 13/422* (2006.01)

(52) U.S. Cl.
CPC ................................ *H01R 13/4223* (2013.01)

(58) Field of Classification Search
CPC . H01R 13/4223; H01R 13/4226; H01R 43/22
USPC ................................................. 439/595, 752
See application file for complete search history.

(56) References Cited

U.S. PATENT DOCUMENTS

| | | | | |
|---|---|---|---|---|
| 5,187,862 A * | 2/1993 | Ohsumi | H01R 43/22 | 29/758 |
| 5,281,168 A * | 1/1994 | Krehbiel | H01R 13/4362 | 439/598 |
| 5,645,453 A * | 7/1997 | Yamaguchi | H01R 13/4365 | 439/595 |
| 5,980,318 A * | 11/1999 | Morello | H01R 13/4226 | 439/595 |
| 6,171,146 B1 | 1/2001 | Fink et al. | | |
| 6,796,836 B2 * | 9/2004 | Ichida | H01R 43/22 | 439/744 |
| 7,698,810 B2 * | 4/2010 | Huss, Jr. | H01R 13/432 | 29/758 |

(Continued)

FOREIGN PATENT DOCUMENTS

| | | |
|---|---|---|
| DE | 19731934 A1 | 1/1999 |
| DE | 102004002850 A1 | 8/2005 |

(Continued)

OTHER PUBLICATIONS

Extended European Search Report for Application No. 22167638.0; mailed Sep. 28, 2022; 9 pages.

(Continued)

*Primary Examiner* — Marcus E Harcum
(74) *Attorney, Agent, or Firm* — Billion & Armitage

(57) ABSTRACT

A connector assembly comprises an elongated inner signal contact and an insulating element, wherein the insulating element includes a first cavity configured to accommodate the inner signal contact, a latching element configured to secure the inner signal contact in the first cavity, and a second cavity extending in an axial direction and configured to receive a tool for separating the latching element from the inner signal contact.

8 Claims, 4 Drawing Sheets

(56) References Cited

U.S. PATENT DOCUMENTS

| | | | | |
|---|---|---|---|---|
| 8,951,066 | B2 * | 2/2015 | Glick | H01R 13/426 439/752 |
| 9,293,853 | B2 * | 3/2016 | Endo | H05K 5/0221 |
| 10,826,220 | B1 | 11/2020 | Butcher et al. | |
| 10,897,103 | B1 | 1/2021 | Sundarakrishnamachari et al. | |
| 11,139,605 | B2 | 10/2021 | Metzler et al. | |
| 2002/0102878 | A1 * | 8/2002 | Murakami | H01R 13/4364 439/595 |
| 2003/0054691 | A1 * | 3/2003 | Machida | H01R 13/4368 439/752 |
| 2004/0132351 | A1 * | 7/2004 | Miyakawa | H01R 13/4361 439/752 |
| 2006/0035536 | A1 * | 2/2006 | Sai | H01R 13/4365 439/752 |
| 2009/0247011 | A1 * | 10/2009 | Myer | H01R 13/4223 439/595 |
| 2012/0289090 | A1 * | 11/2012 | Oiri | H01R 43/22 439/625 |
| 2013/0023163 | A1 * | 1/2013 | Glick | H01R 13/422 439/752 |
| 2013/0295794 | A1 * | 11/2013 | Nemoto | H01R 13/4226 439/595 |
| 2014/0335720 | A1 | 11/2014 | Like et al. | |
| 2021/0234304 | A1 | 7/2021 | Zebhauser | |
| 2021/0265763 | A1 | 8/2021 | Zebhauser et al. | |
| 2022/0320780 | A1 * | 10/2022 | Ohtaka | H01R 13/4223 |

FOREIGN PATENT DOCUMENTS

| | | | | |
|---|---|---|---|---|
| EP | 0152743 | A1 | 8/1985 | |
| EP | 1369959 | A1 | 12/2003 | |
| EP | 2806505 | A1 | 11/2014 | |
| EP | 2811581 | A1 | 12/2014 | |
| EP | 3713018 | A1 | 9/2020 | |
| EP | 3772783 | A1 | 2/2021 | |
| JP | 2019220288 | A * | 12/2019 | H01R 13/10 |

OTHER PUBLICATIONS

Molex; Application Tooling Specification Sheet; https://docs.rs-online.com/fbd1/0900766b814ad5ea.pdf (accessed Mar. 29, 2023); 6 pages.

Rosenberger Hochfrequenztechnik GmbH & Co.; Crimping Tools & Inserts Extraction Tools Torque Wrenches; https://www.rosenberger.com/0_documents/de/catalogs/ba_communication/catalog_coax/20_Chapter_Tools.pdf (accessed Mar. 3, 2023).

Rosenberger Product Catalog website; https://products.rosenberger.com/radio-frequency/tools-accessories/?p=2 (accessed Mar. 3, 2023).

* cited by examiner

CONNECTOR SYSTEM WITH TOOL-ACCESSIBLE LATCHING MECHANISM

CROSS-REFERENCE TO RELATED APPLICATION

This application claims benefit of priority to European Patent Application No. 22167638.0 filed on Apr. 11, 2022, the entire disclosure of which is hereby incorporated by reference.

TECHNICAL FIELD OF THE INVENTION

The present disclosure relates to a connector assembly, preferably for multi GHz applications. In particular, the disclosure relates to a high speed modular twisted-pair-data connector assembly.

BACKGROUND

High speed modular twisted-pair-data connector systems are used to provide high speed data connections for various automotive systems, including but not limited to 4K camera systems, autonomous driving systems, RADAR systems, LIDAR systems, high-resolution displays, and rear seat entertainment systems. Data connectors for these systems typically require data transmission rates up to 15 GHz or 20 Gbps while having a small package size.

In a known high speed modular twisted-pair-data connector system marketed under the trademark H-MTD® by Rosenberger Hochfrequenztechnik GmbH & Co. KG., an inner signal contact is secured in an insulating element by means of a locking mechanism. For servicing or repair purposes, the locking mechanism can be accessed via a cavity located at a side of the insulating element with a standard tool such as a slotted screwdriver so as to unlock the locking mechanism and, thereby, allow the inner signal contact to be separated from the insulating element.

However, the connector assemblies may require multiple cavities containing multiple inner signal contacts mounted in a side-by-side arrangement in the insulating element. Also, the connector assemblies may be mounted within another device, such that the insulating element is only accessible from a front-side thereof. In both cases, accessing a cavity provided on a side of the insulating element may be troublesome or even not possible. In addition, operating the locking mechanism by executing an unguided movement with a standard tool, such as a screwdriver, risks damaging or breaking the locking mechanism.

Accordingly, there is a need to provide a high speed modular twisted-pair-data connector system that can be easily, securely, and safely disassembled.

SUMMARY

In one aspect, the present disclosure is directed at a connector assembly comprising an elongated inner signal contact and an insulating element. The insulating element includes a first cavity configured to accommodate the inner signal contact, a latching element configured to secure the inner signal contact in the first cavity, and an elongated second cavity extending in an axial direction and configured to receive a tool for separating the latching element from the inner signal contact.

The first cavity and the second cavity may be separated by the latching element.

Furthermore, the latching element may comprise a protrusion extending into the first cavity, which is configured to interact with a latching shoulder of the inner signal contact when the inner signal contact is accommodated in the first cavity. In other words, the protrusion serves as a securing means for securing the inner signal contact in the first cavity.

The latching element may also comprise a hook section defining an end portion of the second cavity, wherein the hook section is configured to receive an end of an insertion portion of the tool.

In the vicinity of an entry opening of the second cavity, the insulating element may define a pivot bearing for the tool. A pivot axis defined by the pivot bearing may be perpendicular to the axial direction. Furthermore, the pivot bearing may be positioned at an axial distance from the hook section.

Thus, when the tool is fully inserted into second cavity, the tool can be pivoted around the pivot axis so as to disengage the protrusion of the latching element from the inner signal contact to thereby allow removal of the inner signal contact from the first cavity.

For easy handling, the first cavity and the second cavity may extend substantially parallel to each other. In other words, the second cavity does not need to be inserted from a lateral side of the insulating element which may be cumbersome or even impossible. Instead, it can be inserted from a front side of the insulating element which is usually easily accessible. Furthermore, the first cavity and the second cavity may be configured to allow for insertion of the inner signal contact and the tool from opposite sides of the insulating element. Thus, the tool can be inserted via a front side of the insulating element while the inner signal contact is removed via a back side of the insulating element.

According to another aspect, the present disclosure is directed at a connector system comprising a connector assembly of the kind described above and the aforementioned tool. The tool may comprise a handle and an insertion portion. Furthermore, the tool may comprise a pivot means formed between the handle and the insertion portion. The pivot means may be configured to interact with a pivot bearing defined by the insulating element.

Further advantages, features and areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present invention is now described, by way of example with reference to the accompanying drawings, in which.

DETAILED DESCRIPTION

Figure 1A:
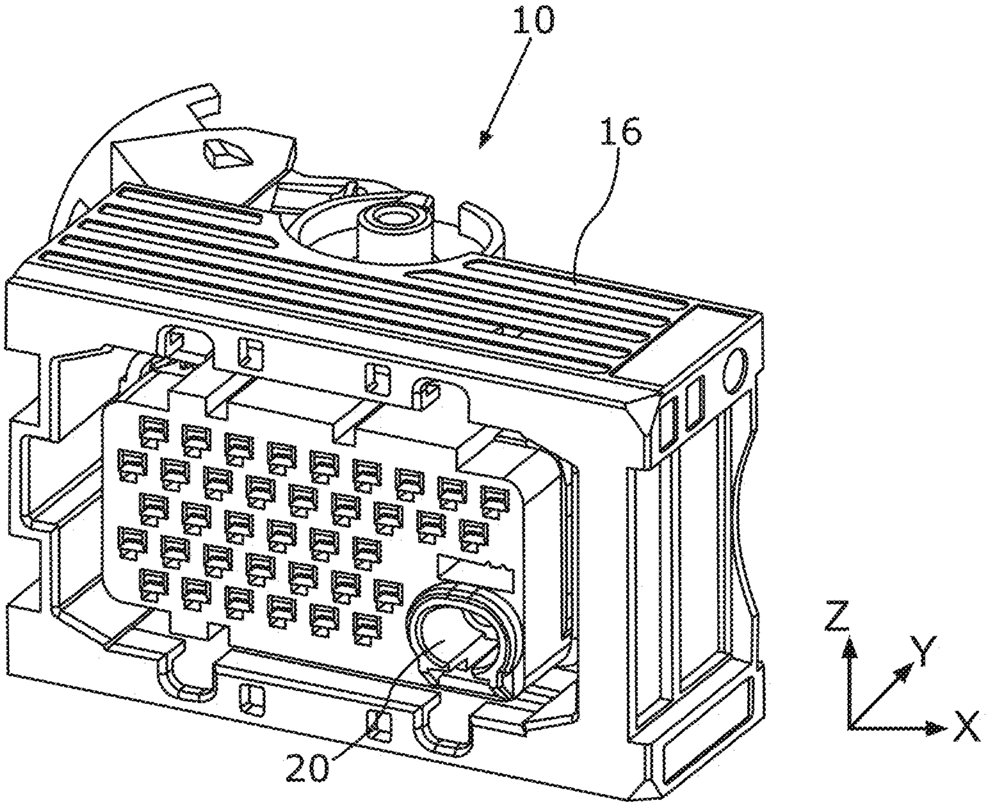
FIG. 1A is an isometric view of an insulating element of the connector assembly according to some embodiments.
Figure 2:
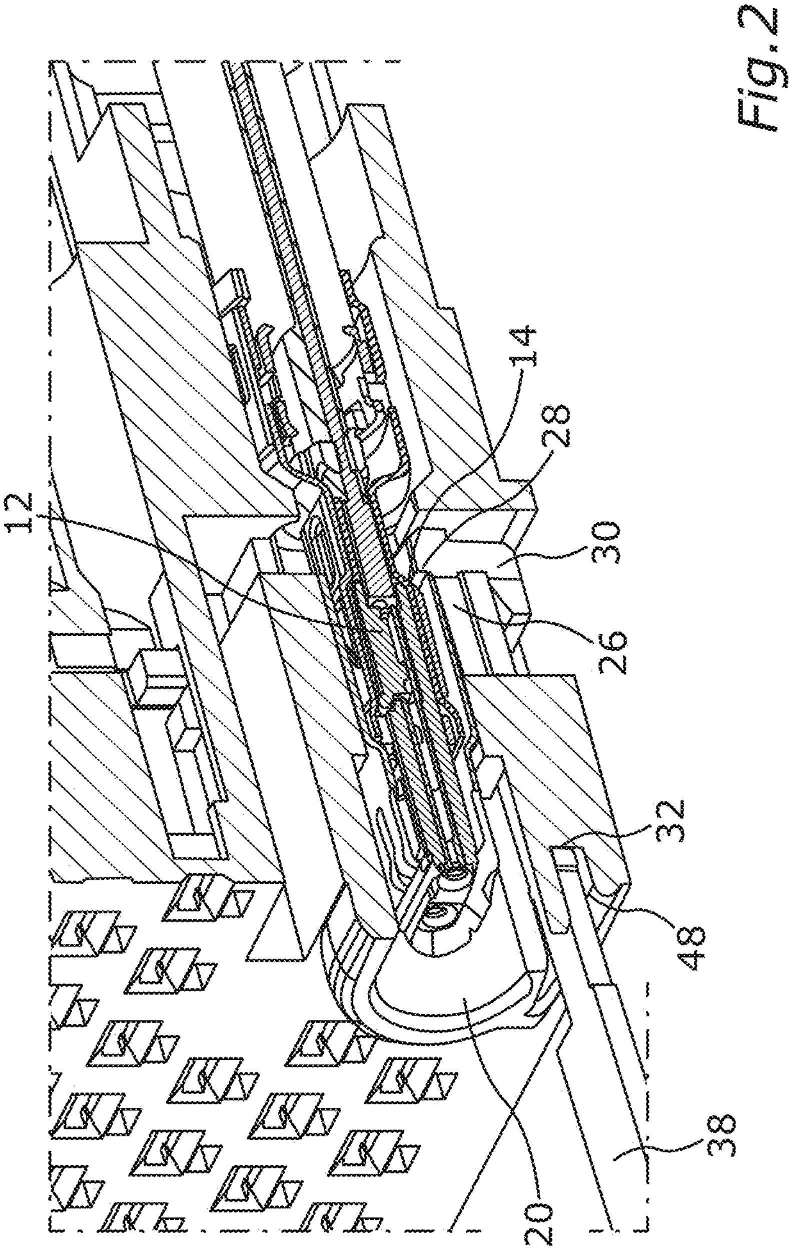
FIG. 2 is an isometric view of the insulating element with the first cavity accommodating an inner signal contact and the second cavity accommodating the tool according to some embodiments.

FIG. 1A depicts an isometric view onto a front side of an insulating element 16 of a connector assembly 10. The connector assembly 10 may be high speed modular twisted-pair-data connector assembly. The insulating element 16 serves as a dielectric housing and defines an elongated first cavity 18 for accommodating an inner signal contact 12, as shown in FIG. 2.

Figure 1B:
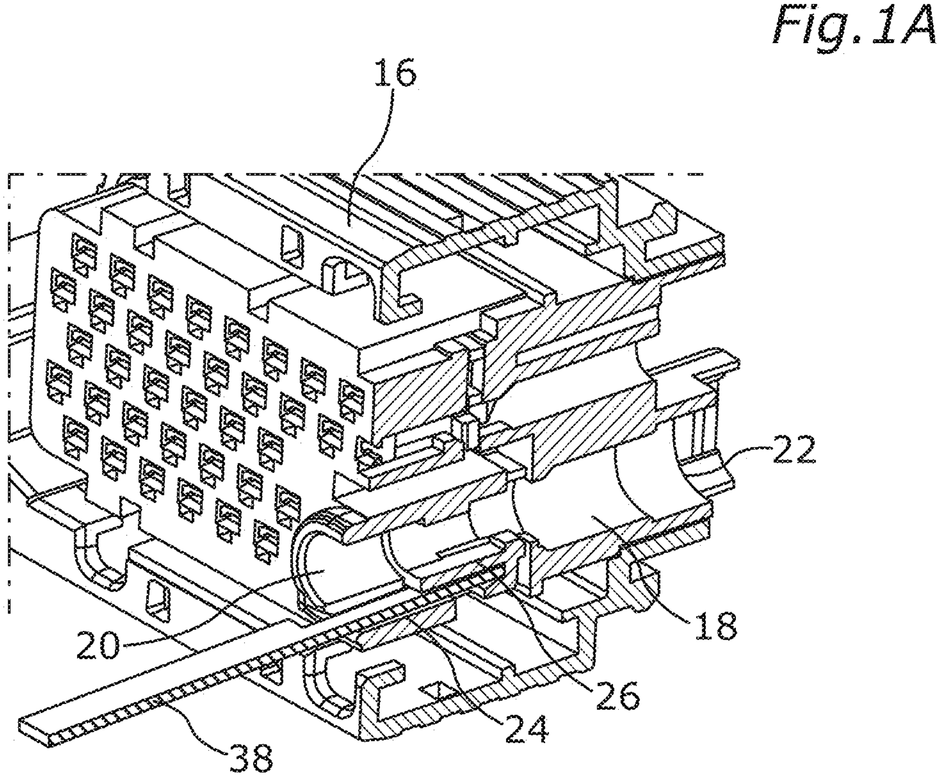
FIG. 1B is an isometric cross-sectional view of the insulating element having a first cavity and a second cavity, wherein a tool is inserted into the second cavity according to some embodiments.

As can be seen in FIG. 1B, the first cavity 18 has a first opening 20 at a front side of the insulating element 16 and a second opening 22 at a back side of the insulating element 16. A connection portion of the inner signal contact 12 accommodated in the first cavity 18 can be accessed via the first opening 20, e.g., by a mating electrical connector, whereas the inner signal contact 12 can be inserted into the first cavity 18 via the second opening 22 of the insulating element 16.

Figure 3A:
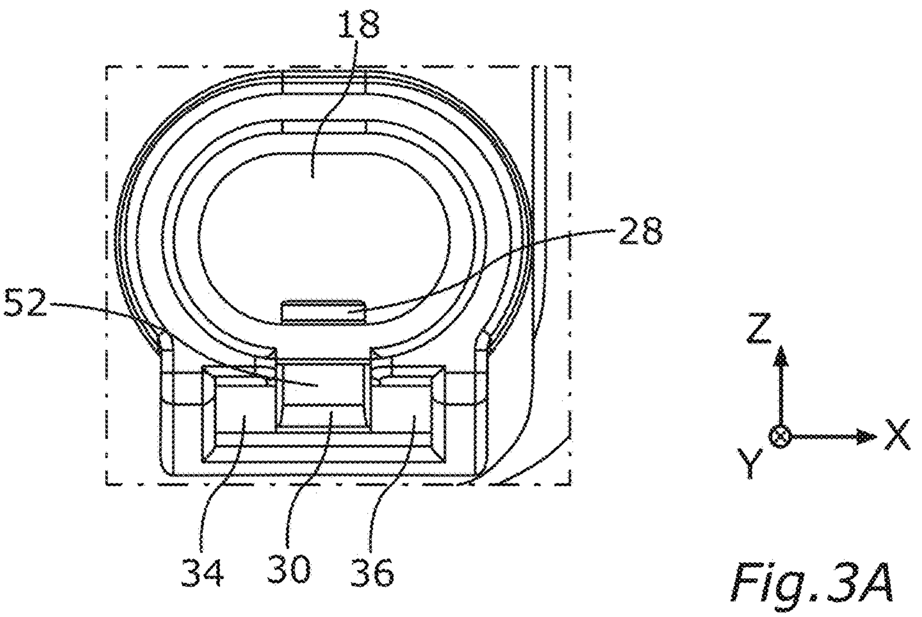
FIG. 3A is a front view of a first cavity and a second cavity defined by the insulating element according to some embodiments.
Figure 3B:
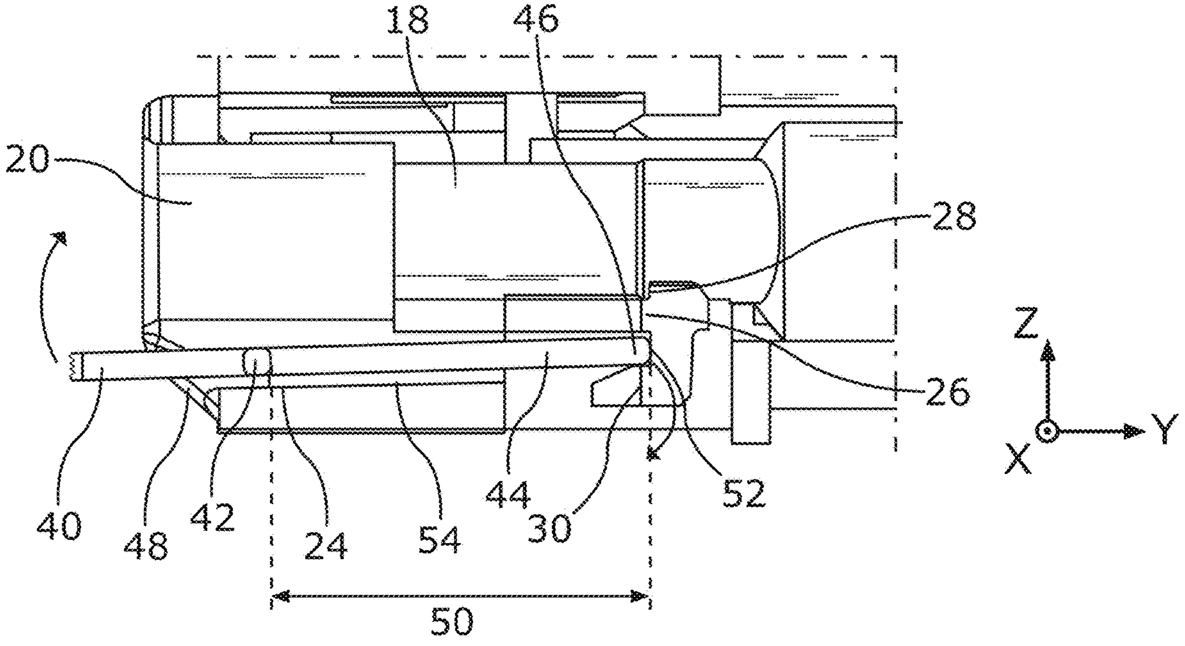
FIG. 3B is a longitudinal-sectional view of the first cavity and the second cavity with the tool being inserted into the second cavity according to some embodiments.

The insulating element 16 also defines a second cavity 24 associated with the first cavity 18. The second cavity 24 extends in an axial direction (the Y-direction in the drawings) and substantially parallel to the first cavity 18. The second cavity 24 further has an entry opening 48 at the front side of the insulating element 16 via which a dedicated tool 38 described in more detail below can be inserted (FIGS. 1B and 3B). Thus, the first cavity 18 and the second cavity 24 are configured to allow for insertion of the inner signal contact 12 and the tool 38 from opposite sides of the insulating element 16. As can be seen in FIG. 3B, a cross-sectional area of the second cavity 24 is dimensioned so as to allow for a lever movement of the tool 38. More specifically, there is a clearance 54 between a boundary wall of the second cavity 24 and an insertion portion 44 of the tool 38 when the tool 38 is fully inserted into the second cavity 24.

The first cavity 18 and the second cavity 24 share a common wall portion that serves as a latching element 26. The latching element 26 comprises a protrusion 28 that extends into the first cavity 18. As depicted in FIG. 2, when the inner signal contact 12 is correctly positioned in the first cavity 18, the protrusion 28 engages behind a latching shoulder 14 of the inner signal contact 12, thereby securing the inner signal contact 12 in the first cavity 18 against an unintended movement out of the first cavity 18.

The latching element 26 further comprises a hook section 30 which defines an end portion of the second cavity 24. The hook section 30 extends in a direction opposite from the protrusion 28 and is configured to receive a leading end 46 of an insertion portion 44 of the tool 38 (FIG. 3B). An end region of the hook section 30 may feature the shape of a wedge so as to facilitate insertion of the tool 38 into the hook section 30.

In the vicinity of the entry opening 48 of the second cavity 24, the insulating element 16 further defines a pivot bearing 32 adapted to cooperate with the tool 38. More specifically, as can be seen in FIG. 3A, the pivot bearing 32 comprises two neighboring surface portions, a first surface portion 34 on a left side of the second cavity 24, and a corresponding second surface portion 36 on a right side of the second cavity 24 as viewed in the axial direction. Said first and second surface portions extend in a plane generally perpendicular to the axial direction, i.e., in a plane defined by the vertical direction Z and the horizontal direction X in FIGS. 3A and 3B, and are located at the same height with respect to the vertical direction.

Figure 4:
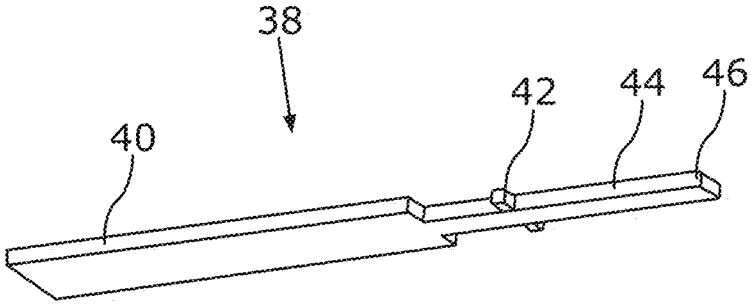
FIG. 4 is an isometric view of the tool according to some embodiments.

FIG. 4 is an isometric view of the tool 38 for separating the latching element 26 from the inner signal contact 12. The tool 38 comprises a handle 40, a pivot means 42 and an insertion portion 44. The pivot means 42 is formed between the handle 40 and the insertion portion 44 and comprises two lateral pins 42 extending in opposite directions from a main body of the tool 38. The insertion portion 44 has an elongated shape and a leading end 46 of the insertion portion 44 is configured to be received in the hook section 30 of the latching element 26. A rear end of the insertion portion 44 is defined by the lateral pins 42.

The handle 40 may feature an outer cross-sectional dimension larger than that of the insertion portion 44 so as to allow for convenient handling by a user. In addition, the lateral pins 42 may have rounded edges to facilitate a lever movement of the tool 38.

The pivot bearing 32 and the hook section 30 are separated by a predetermined distance 50 in the axial direction. More specifically, a distance 50 between the pivot bearing 32 and the end surface 52 of the second cavity 24 defined by the inner surface of the hook section 30 generally corresponds to the length of the insertion portion 44 of the tool 38.

As is indicated by the two bent arrows in FIG. 3B, the tool 38 can be rotated about a pivot axis generally perpendicular to the axial direction when the tool 38 is fully inserted into the second cavity 24, i.e., when the pivot means 42 is in contact with the pivot bearing 32 and the leading end 46 of the insertion portion 44 is received in the hook section 30. More specifically, the pivot axis is located at the interface between the lateral pins 42 and the first and second surface portions. Due to the clearance 54 between the second cavity 24 and the insertion portion 44, the tool 38 can perform a lever movement during which the latching element 26 is bent in the vertical direction Z, i.e., in a direction away from the first cavity 18 and into the second cavity 24. Consequently, the protrusion 28 of the latching element 26 is disengaged from the latching shoulder 14 of the inner signal contact 12, and the inner signal contact 12 can be removed from the insulating element 16.

During the lever movement, the displacement of the leading end 46 of the insertion portion 44 in the vertical direction is limited by the second cavity 24 and thereby defines a maximum displacement of the latching element 26 from a locking position to a release position. In other words, as soon as the release position is reached, further displacement of the insertion portion 44 is blocked by a boundary wall of the second cavity 24, i.e., the latching element 26 can only bent as far as necessary for unlatching the inner signal contact 12.

Excessive bending of the latching element 26 can thus be prevented. Accordingly, unlatching of the inner signal contact 12 can be executed in a user friendly and well-controlled manner, and damage or breaking of the latching element 26 can be avoided. Thus, it is possible to easily and securely disassemble the connector assembly 10.

Moreover, the width of the second cavity 24 in the horizontal direction X substantially corresponds to the width of the insertion portion 44 of the tool 38, and the pivot bearing 32 and the pivot means 42 come into contact as soon as the end position of the tool 38 inserted into the second cavity 24 is reached. Hence, an insertion movement of the tool 38 into the second cavity 24 along the axial direction is well guided and restricted. Therefore, not only the tool 38 can easily be inserted into the second cavity 24, but also no excessive force can be exerted in the axial direction on the hook section 30 of the latching element 26, both helping to prevent any damage to or breaking of the latching element 26.

It is to be understood that the insulating element 16 may define not only one first cavity 18 and one second cavity 24, but a plurality of first cavities 18 and, correspondingly, a plurality of respective second cavities 24.

Also, the entry opening of the second cavity 24 may be located at the back side of the insulating element 16, rather than at the front side of the insulating element 16. It is even conceivable that the entry opening of the second cavity 24 is located at a side of the insulating element 16 other than the front and back sides, in which case the second cavity 24 would extend transversely to the first cavity 18.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A connector system, comprising:
a connector assembly comprising:
an elongated inner signal contact; and
an insulating element including:
a first cavity configured to accommodate the inner signal contact,
a latching element configured to secure the inner signal contact in the first cavity, and
an elongated second cavity extending in an axial direction and configured to receive a tool for separating the latching element from the inner signal contact, wherein a cross-sectional dimension of the second cavity is adapted so as to allow for a lever movement of the tool, wherein the insulating element defines a pivot bearing for the tool in a vicinity of an entry opening of the second cavity, wherein the pivot bearing comprises two neighboring surface portions, a first surface portion on a left side of the second cavity and a corresponding second surface portion on a right side of the second cavity as viewed in the axial direction, wherein a pivot axis defined by the pivot bearing is perpendicular to the axial direction; and
the tool for separating the latching element from the inner signal contact, wherein the tool has a handle and an insertion portion, wherein the tool further comprises a pivot means formed between the handle and the insertion portion, wherein the pivot means is configured to interact with the pivot bearing defined by the insulating element, wherein the pivot bearing and the pivot means come into contact as soon as an end position of the tool inserted into the second cavity is reached, wherein the pivot means comprises two lateral pins extending in opposite directions from a main body of the tool, wherein the pivot axis is located at an interface between the lateral pins and the first and second surface portions.

2. The connector system according to claim 1, wherein the first cavity and the second cavity are separated by the latching element.

3. The connector system according to claim 1, wherein the latching element comprises a protrusion extending into the first cavity, the protrusion being configured to interact with a latching shoulder of the inner signal contact when the inner signal contact is accommodated in the first cavity.

4. The connector system according to claim 1, wherein the latching element comprises a hook section defining an end portion of the second cavity, the hook section being configured to receive a leading end of an insertion portion of the tool.

5. The connector system according to claim 1, wherein the pivot bearing is positioned at an axial distance from the hook section.

6. The connector system according to claim 1, wherein the first cavity and the second cavity extend substantially parallel to each other.

7. The connector system according to claim 1, wherein the first cavity and the second cavity are configured to allow for insertion of the inner signal contact and the tool from opposite sides of the insulating element.

8. The connector system according to claim 1, wherein the first cavity and the second cavity are configured to allow for insertion of the tool via a front side of the insulating element and removal of the inner signal contact via a back side of the insulating element.

* * * * *